6966X
O. C. HARRIS.
Paint Mill.
Patented Mar. 15, 1832.
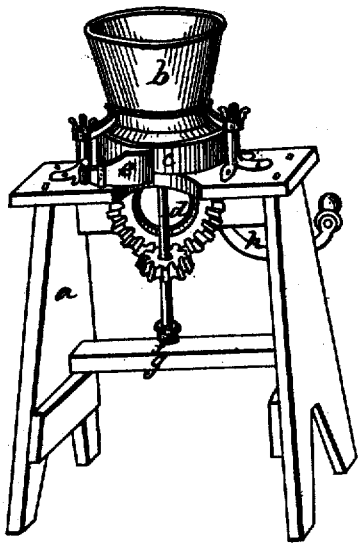
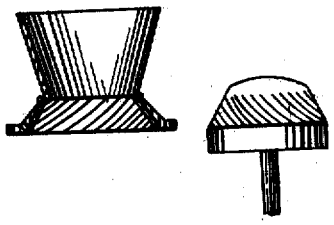
THE NORRIS PETERS CO., PHOTO-LITHO., WASHINGTON, D. C.

{[illegible] & Extended by Special Act of Congress approved 11 August [illegible] for [illegible]

March 15. 1892 135

69616X Oliver C. Harris
Letters Patent

The schedule referred to in these Letters Patent and making part of the same containing a description in the words of the said Oliver C. Harris himself of his improvement in the manner of grinding Paints Indigo &c.

To all persons to whom these presents shall come Oliver C Harris of the Town of Sangerfield County of Oneida and State of New York sends greeting. Be it known that I the said Oliver C. Harris have invented a new and useful improvement not known or used before in the grinding of Paints Indigo and other substances which require grinding. which invention and the manner of using it is as follows. This improvement consists of a frame in the top of which a hollow cast iron curb is firmly attached having its circumference gradually enlarged at the base so as to form a cap for the nut or runner herein after described. The interior surface of this enlarged portion of the curb is indented with teeth crossing the surface transversely immediately under it a circular cast iron nut or runner of any convenient thickness is placed to the centre of which a perpendicular shaft or spindle is attached, the lower end of the shaft resting on a box or step composed of cast iron or of any other suitable material. This box or step is firmly secured to a horizontal bridge the ends of which pass through the sides of the frame. A portion of the upper surface of the nut forming a border around its outer edge is sloped downward to the edge to an angle corresponding with that of the curb above it and is indented with teeth extending across the surface transversely like those in the cap above it, but slanted in a direction contrary from that of the teeth in the cap so that the last mentioned teeth shall intersect and cross those in the Extended by act of Congress approved 11 Aug 1838

6966X Mar 15, 1832 nut. A thin scraper, composed of sheet iron or any other suitable material is fastened by one end to a part of the frame whilst the other is made to press lightly upon the broad circumference of the nut. The bridge above mentioned may be elevated or depressed at pleasure accordingly as the machine is required to grind coarser or finer. By raising it the teeth in the nut are brought nearer to those in the cup of the curb and by lowering it the distance is increased.

This distance is regulated by means of a wedge which passes under the bridge. It may however be regulated by a screw or in any other convenient manner. To the perpendicular shaft above mentioned a cog wheel or pulley is secured to which power is applied to put the machine in operation.

In witness whereof I have hereunto subscribed my name this fifth day of March A.D. 1832

Oliver C. Harris

Witnesses
Reuben Bacon
S.P. Harris

Patented March 15, 1832